US012513556B2

(12) United States Patent
Okuda et al.

(10) Patent No.: US 12,513,556 B2
(45) Date of Patent: Dec. 30, 2025

(54) VEHICLE CONTROL DEVICE, SYSTEM, AND VEHICLE CONTROL METHOD (71) Applicant: TOYOTA JIDOSHA KABUSHIKI KAISHA, Toyota (JP)

(72) Inventors: Masataka Okuda, Toyota (JP); Kanade Kuriyama, Toyota (JP); Masatoshi Kakutani, Miyoshi (JP); Kaoru Yoshida, Toyota (JP); Hiroki Maki, Toyota (JP); Kosuke Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 18/152,620

(22) Filed: Jan. 10, 2023

(65) Prior Publication Data
US 2023/0254725 A1 Aug. 10, 2023

(30) Foreign Application Priority Data
Feb. 4, 2022 (JP) ................................. 2022-016651

(51) Int. Cl.
H04W 28/02 (2009.01)
(52) U.S. Cl.
CPC ... H04W 28/0231 (2013.01); H04W 28/0273 (2013.01)
(58) Field of Classification Search
CPC ... H04L 45/121; H04L 45/24; H04L 57/2433; H04L 67/12; H04L 67/125; H04W 28/0231; H04W 28/0273
See application file for complete search history.

(56) References Cited

U.S. PATENT DOCUMENTS

| 2007/0076652 | A1 | 4/2007 | Nishiwaki |
| 2016/0156717 | A1 | 6/2016 | Matsumoto et al. |
| 2019/0098542 | A1 | 3/2019 | Tang |
| 2019/0132818 | A1 | 5/2019 | Yasukawa et al. |
| 2020/0073377 | A1 | 3/2020 | Yang |
| 2020/0359390 | A1* | 11/2020 | Kang .................... H04W 88/08 |
| 2021/0258750 | A1 | 8/2021 | Otaka et al. |
| 2021/0258982 | A1* | 8/2021 | Otaka ............... H04W 28/0967 |
| 2022/0369144 | A1* | 11/2022 | Lee ........................ H04W 24/10 |

(Continued)

FOREIGN PATENT DOCUMENTS

| CN | 109151034 A | 1/2019 |
| CN | 113891288 A | 1/2022 |

(Continued)

OTHER PUBLICATIONS

Kaoru Yoshida et al., U.S. Appl. No. 17/821,901, filed Aug. 24, 2022.

Primary Examiner — Donald L Mills
(74) Attorney, Agent, or Firm — SoraIP, Inc.

(57) ABSTRACT

A vehicle control device includes communication equipment configured to transmit a plurality of signals to a vehicle using a plurality of communication paths, and a processor. The processor is configured to acquire a communication latency for each of the communication paths, and determine a communication path to allocate to each of the signals based on the communication latency that is acquired. The communication equipment is configured to execute transmission of each of the signals to the vehicle using the communication path that is allocated.

10 Claims, 4 Drawing Sheets (56) References Cited

U.S. PATENT DOCUMENTS

2023/0156790 A1\* 5/2023 Blasco Serrano ............................ H04W 72/0446 370/329
2024/0363004 A1\* 10/2024 Ran ...................... G08G 1/0133

FOREIGN PATENT DOCUMENTS

| | | |
|---|---|---|
| JP | 2007-102406 A | 4/2007 |
| JP | 2008-305083 A | 12/2008 |
| JP | 2016-101785 A | 6/2016 |
| JP | 2019-505059 A | 2/2019 |
| JP | 2019-521535 A | 7/2019 |
| JP | 2020-113106 A | 7/2020 |
| JP | 2021-132300 A | 9/2021 |
| JP | 7017594 B2 | 2/2022 |
| WO | 2017/079290 A1 | 5/2017 |

\* cited by examiner

FIG. 1

VEHICLE CONTROL DEVICE, SYSTEM, AND VEHICLE CONTROL METHOD

CROSS-REFERENCE TO RELATED APPLICATION

This application claims priority to Japanese Patent Application No. 2022-016651 filed on Feb. 4, 2022, incorporated herein by reference in its entirety.

BACKGROUND

1. Technical Field

The present disclosure relates to a vehicle control device that communicates with a vehicle and controls the vehicle, a system, and a vehicle control method.

2. Description of Related Art

Japanese Unexamined Patent Application Publication No. 2019-505059 (JP 2019-505059 A) discloses an autonomous vehicle service platform that is connected to a plurality of autonomous vehicles that automatically drive on a road network so as to be communicable with autonomous vehicles via a network. This autonomous vehicle service platform remotely controls the autonomous vehicles and provides users with various services using the autonomous vehicles.

SUMMARY

In a system in which a vehicle and a control device provided on the cloud are connected via a network, communication delay occurs between the vehicle and the cloud. Accordingly, it is desirable to reduce the effects of communication delay occurring between the vehicle and the cloud when the control device controls the vehicle.

The present disclosure has been made in view of the above problems, and an object thereof is to provide a vehicle control device and the like that can reduce the effects of communication delay that occur with regard to a vehicle.

A vehicle control device according to a first aspect of the present disclosure includes communication equipment configured to transmit a plurality of signals to a vehicle using a plurality of communication paths, and a processor. The processor is configured to acquire a communication latency for each of the communication paths, and determine a communication path to allocate to each of the signals based on the communication latency that is acquired. The communication equipment is configured to execute transmission of each of the signals to the vehicle using the communication path that is allocated.

According to such a configuration, effects of communication delay that occurs between the vehicle and the vehicle control device can be reduced.

In the vehicle control device according to the first aspect, the processor may be configured to set a priority level regarding communication for the signals. Here, the processor may be configured to determine a communication path to allocate to each of the signals based on the communication latency and the priority level.

In the vehicle control device according to the first aspect, the processor may be configured to preferentially allocate a signal of which the priority level is higher than a predetermined reference to a communication path of which the communication latency is little.

In the vehicle control device according to the first aspect, the processor may be configured to further acquire a total communication latency for the communication paths combined. The processor may be configured to reduce at least part of traffic of a signal of which the priority level is lower than a predetermined reference when the total communication latency is no less than a predetermined threshold value.

In the vehicle control device according to the first aspect, the signals may include a signal of which the priority level cannot be changed by a user of the vehicle, and a signal of which the priority level can be changed.

In the vehicle control device according to the first aspect, the signal of which the priority level cannot be changed by the user of the vehicle may be a signal of a high priority level that is related to safety and peace of mind with regard to the vehicle.

In the vehicle control device according to the first aspect, the processor may be configured to execute a plurality of applications. The signals may be based on requests from the applications.

In the vehicle control device according to the first aspect, the processor may be configured to set a priority level regarding communication as tag information for the plurality of applications. The processor may be configured to set the priority level of the signals by embedding the tag information set in the applications in the signals.

In the vehicle control device according to the first aspect, the processor may be configured to generate a digital twin that is time-synchronized with real space in virtual space using a communication delay time between the vehicle and the vehicle control device based on the communication latency.

A system according to a second aspect of the present disclosure includes a plurality of vehicles and a vehicle control device. The vehicle control device includes communication equipment configured to transmit a plurality of signals to an object vehicle using a plurality of communication paths, and a processor.

The processor is configured to acquire a communication latency for each of the communication paths, and determine a communication path to allocate to each of the signals based on the communication latency.

Also, the communication equipment is configured to execute transmission of each of the signals to the object vehicle using the communication path that is allocated.

A vehicle control method according to a third aspect of the present disclosure is executed by a vehicle control device including a processor and communication equipment. The vehicle control method includes acquiring, by the processor, a communication latency for each of a plurality of communication paths used for communication with a vehicle, determining, by the processor, a communication path to be allocated for each of a plurality of signals to be transmitted to and received from the vehicle, based on the communication latency, and executing, by the communication equipment, transmission of each of the signals, using the communication path that is allocated.

The vehicle control method according to the third aspect may include setting to the signals, by the processor, a priority level regarding communication. When determining the communication path to be allocated, the processor may determine the communication path to be allocated to each of the signals based on the communication latency and the priority level.

In the vehicle control method according to the third aspect, when determining the communication path to be allocated, the processor may preferentially allocate a signal of which the priority level is higher than a predetermined reference to a communication path of which the communication latency is little.

The vehicle control method according to the third aspect may further include, by the processor, further acquiring a total communication latency that is a combination of the communication paths. Also, at least part of traffic of a signal of which the priority level is lower than a predetermined reference may be reduced by the processor when the total communication latency is no less than a predetermined threshold value.

According to the vehicle control device and so forth of the present disclosure, the effects of communication delay occurring with the vehicle when the vehicle is controlled using the control device can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device according to the present disclosure acquires communication latency of each of a plurality of communication paths used in communication with a vehicle, and based on the communication latency, determines a communication path to be allocated to each of a plurality of signals transmitted to and received from the vehicle. Signals with a priority level that is high are preferentially allocated to communication paths with little communication latency over signals with a low priority level. Thus, signals with a priority level that is high can be preferentially allocated to stable communication paths with little communication latency, and accordingly communication stability can be ensured for functions with a high priority level.

An embodiment of the present disclosure will be described below in detail with reference to the drawings.

Embodiment

Configuration

Figure 1:
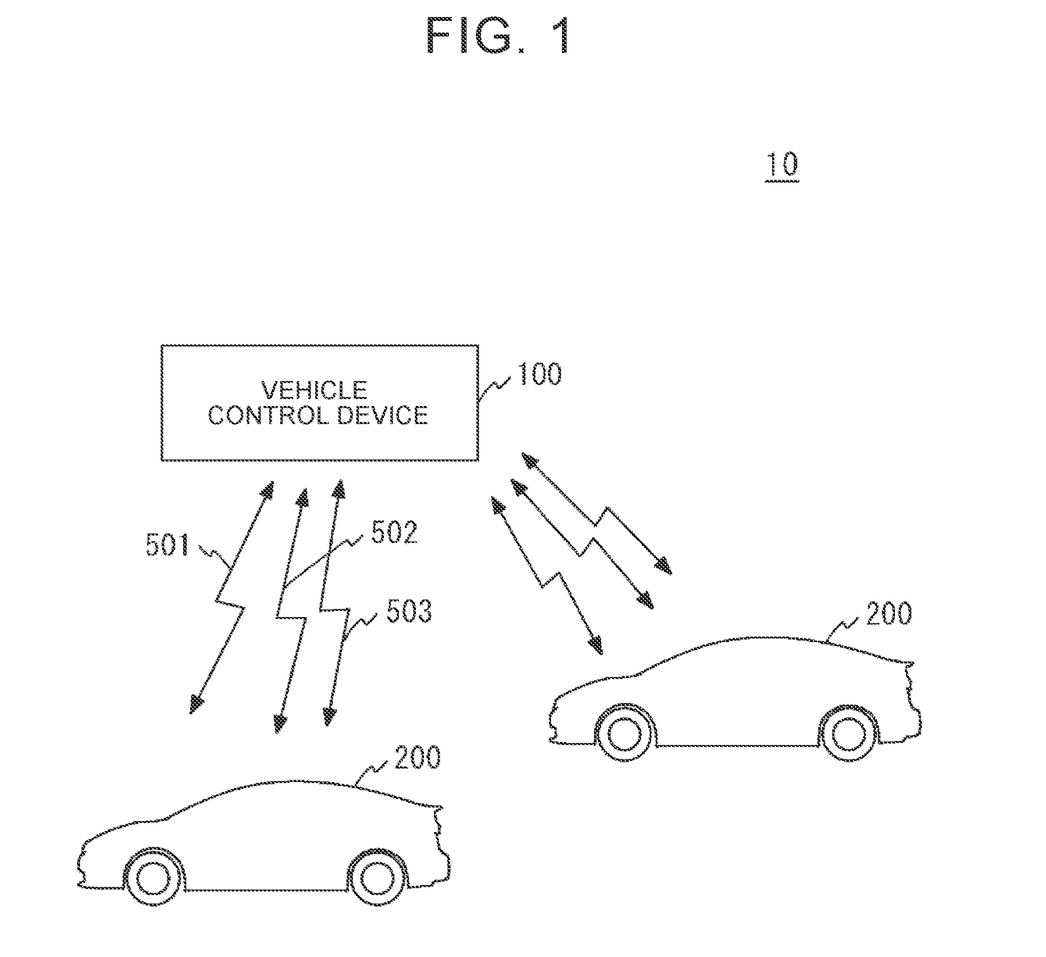
FIG. 1 is a schematic configuration diagram of a system including a vehicle control device according to an embodiment of the present disclosure.

FIG. 1 is a schematic configuration diagram of a vehicle system 10 including a vehicle control device 100 and one or more vehicles 200 according to an embodiment of the present disclosure. The vehicle system 10 is a system of a configuration in which the vehicle control device 100 and each vehicle 200 are communicably connected via a plurality of communication paths 501, 502, and 503, and, for example, the vehicle control device 100 is capable of remote control of at least one vehicle 200. Note that the number of vehicles 200 that can communicate with the vehicle control device 100 is not limited to the number illustrated in FIG. 1.

Figure 2:
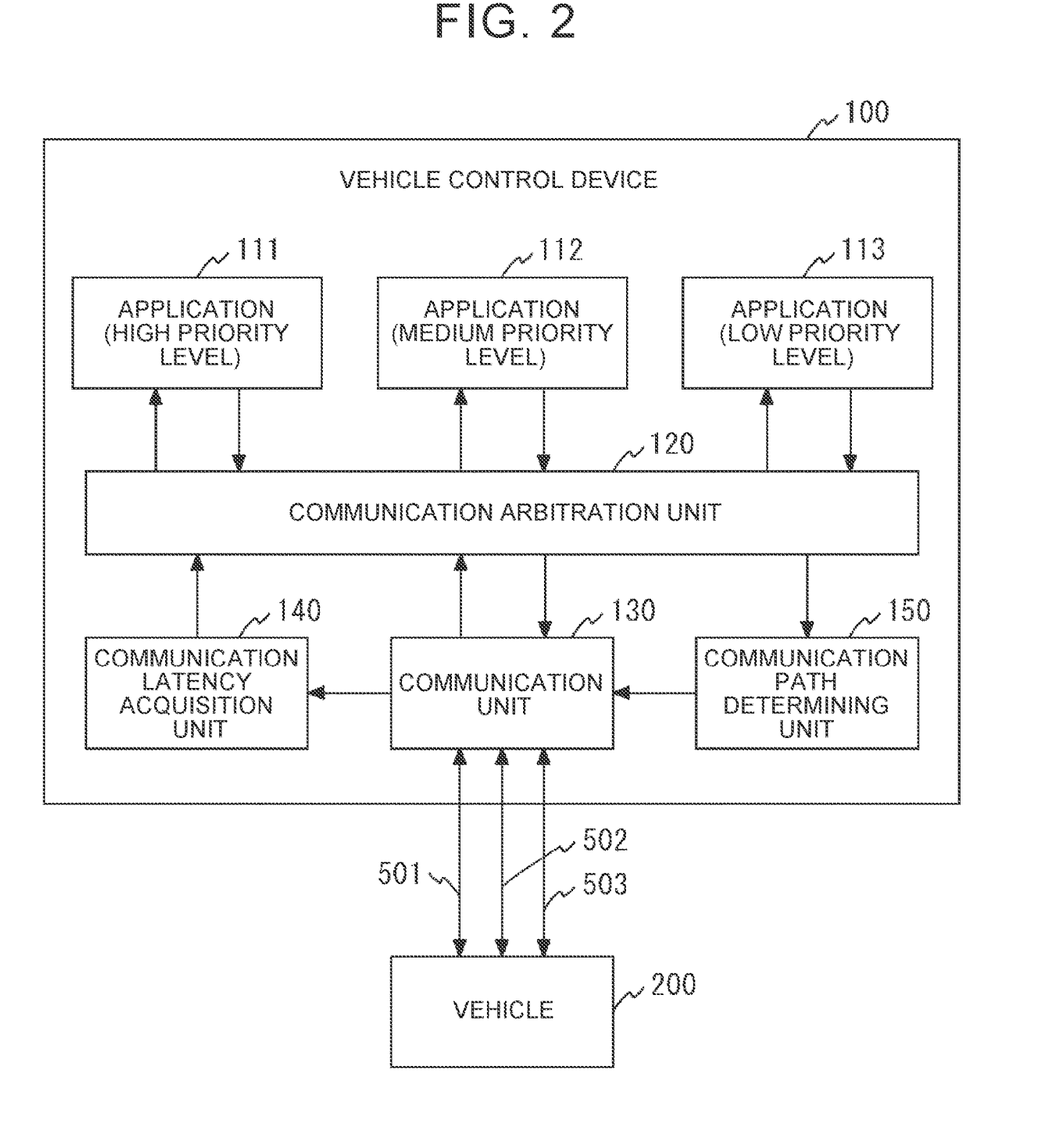
FIG. 2 is a functional block diagram illustrating a schematic configuration example of the vehicle control device.

FIG. 2 is a functional block diagram illustrating a schematic configuration example of the vehicle control device 100 in FIG. 1. The vehicle control device 100 exemplified in FIG. 2 includes a plurality of applications 111, 112, and 113, a communication arbitration unit 120, a communication unit 130, a communication latency acquisition unit 140, and a communication path determining unit 150. This vehicle control device 100 may be configured on the cloud (such as a cloud server), for example.

The applications 111, 112, and 113 are implemented in the vehicle control device 100, and realize various functions (or services) related to the vehicle 200. Examples of functions that are realized include functions related to "safety and peace of mind" of the vehicle 200, functions related to "eco" of the vehicle 200, functions related to "comfort" of the vehicle 200, and functions related to "enjoyment" of the vehicle 200, and so forth. Examples of functions related to "safety and peace of mind" include functions related to motion of the vehicle 200 (traveling, stopping, turning). Examples of functions related to "eco" include functions related to fuel/electricity consumption of the vehicle 200. Examples of functions related to "comfort" include functions related to air conditioning in a vehicle cabin. Examples of functions related to "enjoyment" include functions related to entertainment in the vehicle 200.

Priority levels are set in advance for functions (or services) realized by these applications 111, 112, and 113. That is to say, each of the functions related to "safety and peace of mind", the functions related to "eco", the functions related to "comfort", and the functions related to "enjoyment" has a priority level set in advance regarding communication of signals for realization thereof. As an example, a highest priority level "1" is set to functions related to safety, and thereafter, priority level of "2" is set to functions related to "peace of mind", priority level of "3" is set to functions related to "eco", priority level of "4" is set to functions related to "comfort", and priority level of "5" is set to functions related to "enjoyment", respectively, in order of priority. These priority levels are imparted as tag information to the applications 111, 112, and 113, respectively, and priorities of requests can be expressed by the applications 111, 112, and 113 embedding the tag information, imparted in advance, in part of signals and data in communication with the vehicle 200. Also, the priority level of functions related to "safety and peace of mind" of the vehicle 200 is preferably unchangeable, due to being important items, while functions related to "eco", functions related to "comfort", and functions related to "enjoyment", of the vehicle 200 may be changeable according to preferences of the user (driver or the like) of the vehicle 200.

Note that in the present embodiment, three applications, that is, the application 111 with the highest priority level (high priority level), the application 113 with the lowest priority level (low priority level), and the application 112 with an intermediate priority level between the applications 111 and 113 (medium priority level) are exemplified. However, the number of priority level classifications is not limited to the number illustrated in FIG. 2. Also, the number of applications of each priority level implemented in the vehicle control device 100 is not limited to the number illustrated in FIG. 2.

The communication arbitration unit 120 has a function of arbitrating among a plurality of requests regarding communication with vehicle 200, received from the applications 111, 112, and 113. This arbitration function includes a function of determining the order of priority of signals requested from each of the applications 111, 112 and 113, a function of thinning out traffic of signals requested from each of the applications 111, 112 and 113, and so forth. These functions are executed based on communication latency provided by the communication latency acquisition unit 140, which will be described later. Results of arbitration of the requests are output to the communication unit 130 and the communication path determining unit 150. The communication arbitration unit 120 can also output signals received from the vehicle 200 to the applications 111, 112, and 113, via the communication unit 130.

The communication unit 130 can communicate with the vehicle 200 that is an object of communication via the communication paths 501, 502, and 503. The communication paths 501, 502, and 503 preferably all have different path environments, but an arrangement may be made in which multiple communication paths of the same type are provided physically independently. As an example, the communication paths 501, 502, and 503 may use different networks, different service providers that provide communication, different communication bands, and so forth. In response to requests regarding communication with the vehicle 200, received from the applications 111, 112, and 113, the communication unit 130 transmits signals in accordance with the requests to the vehicle 200. Also, the communication unit 130 outputs signals received from the vehicle 200 to corresponding applications and the communication latency acquisition unit 140. In the present embodiment, an example has been described in which the three communication paths 501, 502, and 503 are provided between the vehicle control device 100 and the vehicle 200. However, the number of communication paths is not limited to the number illustrated in FIG. 2. Moreover, when the vehicle system 10 includes multiple vehicles 200, not all of the vehicles 200 have to use the same communication paths 501, 502, and 503.

The communication latency acquisition unit 140 acquires communication latency regarding communication executed between the vehicle control device 100 and the vehicle 200 via the communication unit 130. The communication latency acquisition unit 140 acquires the communication latency for when the communication paths 501, 502, and 503 are combined into one (when regarded as one communication path), and the communication latency for each of the paths 501, 502, and 503. As an example, these communication latencies can be found by executing a communication latency measurement tool installed in the vehicle control device 100 in advance, communication latency measurement application software that is installed in advance, or the like, and obtaining results from exchanging predetermined test signals between the vehicle control device 100 and the vehicle 200 at a predetermined cycle, and so forth. The communication latency acquisition unit 140 outputs the acquired communication latency to the communication arbitration unit 120.

The communication path determining unit 150 determines one or more of the communication paths 501, 502, and 503 to be used for communication of the signals requested by the applications 111, 112, and 113, based on the results of arbitration by the communication arbitration unit 120. A method of determining the communication paths will be described later.

The vehicle control device 100 described above typically is configured as a device that includes a processor such as a central processing unit (CPU), random-access memory (RAM), and a readable/writable storage device such as a hard disk drive (HDD) or a solid state drive (SSD), and executes programs read from the storage device by the CPU using the RAM as a work area, thereby realizing predetermined processing. Also, the vehicle control device 100 includes communication equipment as the communication unit 130.

Further, the vehicle control device 100 may form a digital twin in the storage device, using the communication delay time between itself and the vehicle 200, and so forth, based on the communication latency acquired by the communication latency acquisition unit 140. This digital twin is a virtual world (virtual space) that is time-synchronized with the real world (real space), by updating and storing, in real time, data related to current and past vehicle conditions (vehicle location, clock time regarding traveling, and so forth) collected with respect to the vehicle 200, and reproduced in cloud computers.

Control

Figure 3:
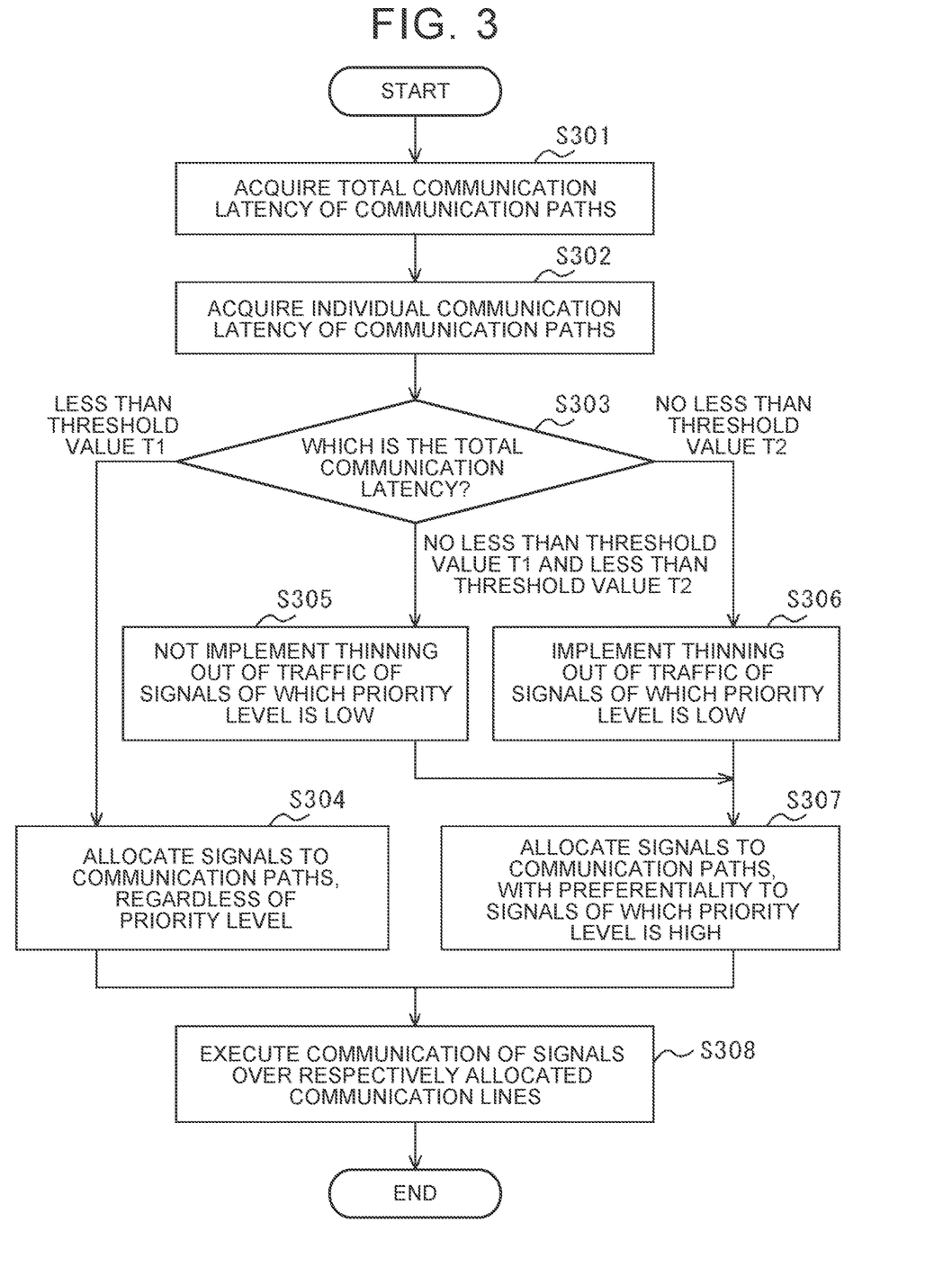
FIG. 3 is a processing flowchart of communication path determining control executed by the vehicle control device.

Next, processing executed by the vehicle control device 100 according to the present embodiment will be described with reference to FIG. 3. FIG. 3 is a flowchart showing processing procedures of communication path determining control executed by each configuration of the vehicle control device 100. The communication path determining control exemplified in FIG. 3 is started when the vehicle control device 100 is communicably connected to the vehicle 200, and is repeatedly executed each time at least one of the applications 111, 112, and 113 requests communication of signals (one or both of transmission and reception), or periodically, until communication with the vehicle 200 ends.

Step S301

The communication latency acquisition unit 140 acquires the "total communication latency", which is the communication latency when the communication paths 501, 502, and 503 connecting the vehicle 200 and the vehicle control device 100 are combined into one. For example, the communication latency acquisition unit 140 is capable of acquiring the total communication latency from results obtained using all of the communication paths 501, 502, and 503 via the communication unit 130 to transmitting and receiving predetermined test signals to and from the vehicle 200, and so forth. Note that the communication delay time may be acquired instead of the communication latency. When the total communication latency for the communication paths combined into one is acquired, the processing advances to step S302.

Step S302

The communication latency acquisition unit 140 acquires "individual communication latency" that is the communication latency of each of the communication paths 501, 502, and 503 connecting the vehicle 200 and the vehicle control device 100. For example, the communication latency acquisition unit 140 is capable of acquiring each individual communication latency for each communication path, from results obtained using one of the communication paths 501, 502, and 503 via the communication unit 130 to transmitting and receiving predetermined test signals to and from the vehicle 200. Note that the communication delay time may be acquired instead of the communication latency. When each individual communication latency for each communication path is acquired, the processing advances to step S303.

Step S303

The communication arbitration unit 120 determines the magnitude of the total communication latency acquired by the communication latency acquisition unit 140. Specifically, the communication arbitration unit 120 determines whether the total communication latency is less than a threshold value T1 set in advance, no less than the threshold value T1 and less than a predetermined threshold value T2 set in advance, or no less than the threshold value T2 (threshold value T1<threshold value T2). As the threshold value T1, a latency is set for determining whether arbitrating allocation of communication paths for multiple signals requested by the applications 111, 112, and 113 is necessary. Also, as the threshold value T2, a latency is set for determining whether thinning out traffic regarding the signals requested by the applications 111, 112, and 113 is necessary.

When the total communication latency is less than the threshold value T1 (less than threshold value T1 in step S303), the processing advances to step S304. When the total communication latency is no less than the threshold value T1 and also is less than the threshold value T2 (no less than threshold value T1 and also less than threshold value T2 in step S303), the processing advances to step S305. When the total communication latency no is less than the threshold value T2 (no less than threshold value T2 in step S303), the processing advances to step S306.

Step S304

The communication path determining unit 150 determines each communication path to be used for communication by the signals from among the communication paths 501, 502, and 503, regardless of the priority levels of the signals requested by the applications 111, 112, and 113. Typically, the communication path determining unit 150 equally allocates the signals requested by the applications 111, 112 and 113 to the communication paths 501, 502 and 503. The definition of equality is not particularly limited, such as equal data volume, equal intervals, and so forth. When the communication paths to be used for communication by the signals of the applications 111, 112, and 113 are determined, the processing advances to step S308.

Step S305

The communication arbitration unit 120 determines not to implement thinning out of traffic with regard to signals with a priority level that is low among the signals requested by the applications 111, 112, and 113 (non-implementation). This determination is based on the reason that when the total communication latency is less than the threshold value T2, communication resources can be sufficiently allocated to signals with a priority level that is high. When a determination is made that thinning out of traffic regarding signals with a priority level that is low is not to be implemented (non-implementation), the processing advances to step S307.

Step S306

The communication arbitration unit 120 implements thinning out of traffic with regard to signals with a priority level that is low among the signals requested by the applications 111, 112, and 113. This determination is based on the reason that when the total communication latency is no less than the threshold value T2, communication resources cannot be allocated to signals with a priority level that is high. Now, a priority level that is low refers to a priority level lower than a predetermined priority level serving as a reference. Accordingly, signals of which the priority level is low are, for example, medium priority level signals and low priority level signals when the predetermined reference is high priority level signals, and are low priority level signals when the predetermined reference is medium priority level signals. Examples of thinning out the traffic of signals with a priority level that is low include reducing the total communication data amount, lowering the communication rate, lengthening the communication cycle, and so forth. When thinning out of the traffic for signals of which the priority level is low is implemented, the processing advances to step S307.

Step S307

The communication path determining unit 150 determines the communication path to be used for communication by the signals requested by the applications 111, 112, and 113, from among the communication paths 501, 502, and 503, preferentially by the signals with a priority level that is high. Now, a priority level that is high refers to a priority level higher than a predetermined priority level serving as a reference. Accordingly, signals of which the priority level is high are, for example, high priority level signals when the predetermined reference is medium priority level signals, and are medium priority level signals and higher priority level signals when the predetermined reference is low priority level signals. Note that the predetermined reference for the determination in step S307 may be the same as or different from the predetermined reference for the determination in step S306. Typically, the communication path determining unit 150 preferentially allocates a communication path with little individual communication latency acquired by the communication latency acquisition unit 140 to signals with a priority level that is high. After the communication paths used for communication by the signals are determined based on the priority level, the processing advances to step S308.

Step S308

The communication unit 130 uses the one or more communication paths regarding which allocation has been determined by the communication path determining unit 150 from among the communication paths 501, 502, and 503, to perform communication of the signals requested from each of the applications 111, 112, and 113. When communication of the signals is executed, this communication path determining control processing ends.

A case in which, following acquiring the total communication latency in which the communication paths 501, 502, and 503 are combined into one (step S301), individual communication latencies are acquired for each of the communication paths 501, 502, and 503 (step S302), has been described in the above processing flow. However, the order of acquiring the total communication latency and the individual communication latencies may be reversed. Alternatively, the total communication latency may be estimated and derived based on a plurality of individual communication latencies acquired for each of the communication paths 501, 502, and 503, without acquiring the total communication latency separately.

Application Example

In the above-described embodiment using FIG. 1, assumption is made that the vehicle control device 100 realizes the functions (or services) when the multiple applications 111, 112, and 113 are installed. Accordingly, only the vehicle control device 100 has the configurations of the communication arbitration unit 120, the communication unit 130, the communication latency acquisition unit 140, and the communication path determining unit 150.

Figure 4:
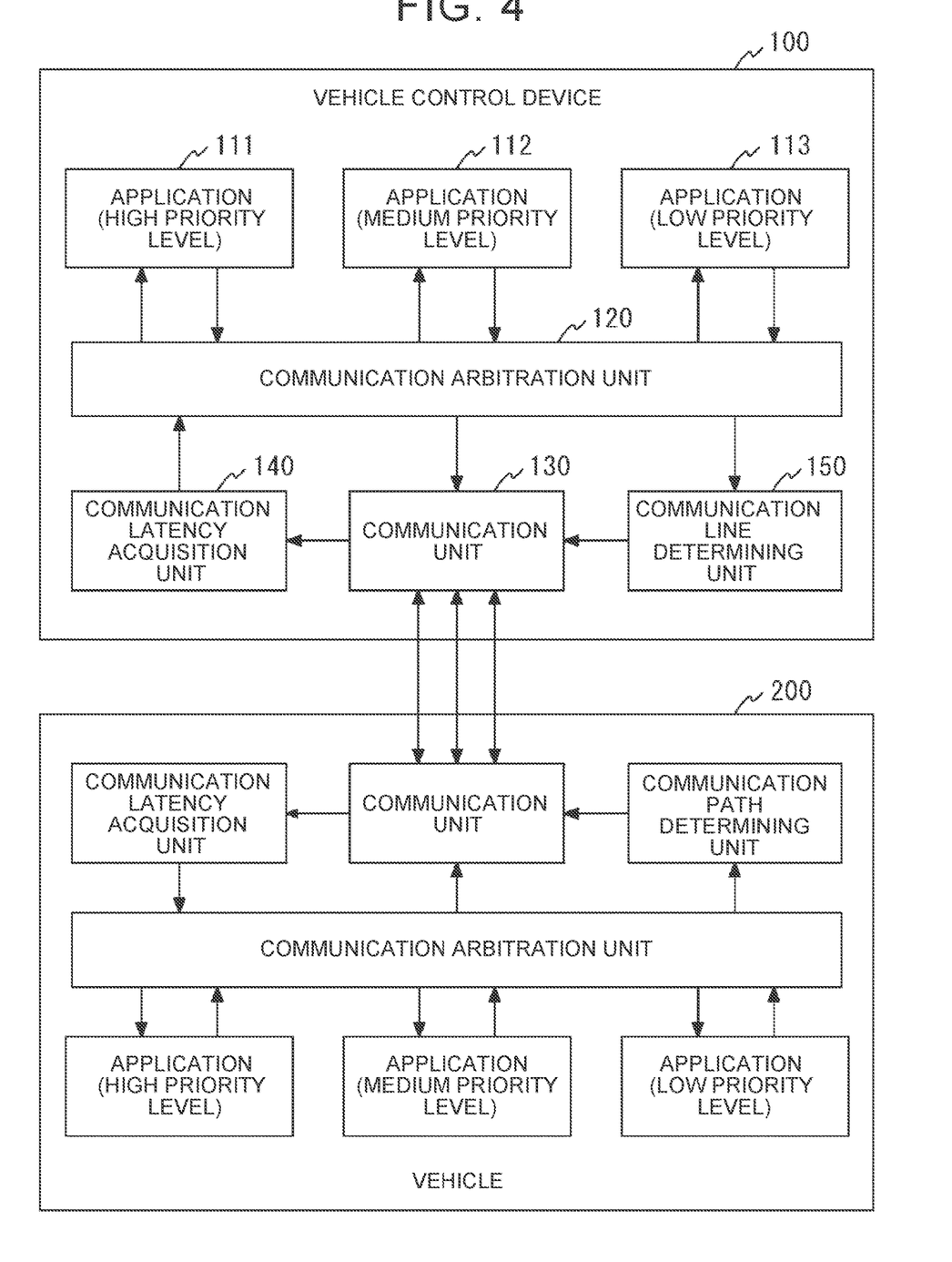
FIG. 4 is a schematic configuration diagram illustrating an example of application to a system including the vehicle control device.

However, there may be cases where one application is divided and implemented (disposed) in the vehicle control device 100 on the cloud side and the vehicle 200 on the mobility side in order to realize one function (or service). In such a case, a system may be used in which the vehicle 200 side also has the configurations of the communication arbitration unit 120, the communication unit 130, the communication latency acquisition unit 140, and the communication path determining unit 150, in the same way as with the vehicle control device 100 side, as exemplified in FIG. 4.

Operations and Effects

As described above, according to the vehicle control device of an embodiment of the present disclosure, communication with the vehicle is performed using multiple communication paths. When performing communication, the vehicle control device acquires communication latencies (total and individual) of the communication paths, and based on the communication latencies that are acquired, determines each of communication paths to be allocated to the signals transmitted to and received from the vehicle. In determining communication paths, signals with a priority level that is relatively high are preferentially allocated communication paths with little communication latency, over signals with a priority level that is relatively low.

According to this processing, signals with a priority level that is high can be allocated to one or more stable communication paths with little communication latency, and thus communication stability can be secured for high-priority functions that are functions relating to safety and peace of mind regarding the vehicle.

Also, according to the vehicle control device of the present embodiment, when there are few excess communication resources in communication paths with little communication latency, the traffic of signals with a priority level that is relatively low is thinned out.

Thus, as can be seen in this processing, by thinning out the traffic of low-priority functions other than functions related to the safety and peace of mind regarding the vehicle, communication resources for high-priority functions can be secured, and the stability of the functions can be ensured.

Although an embodiment of the present disclosure has been described above, the present disclosure can be understood as being a vehicle control device, a method executed by a vehicle control device including a processor and memory, a control program for executing this method, a computer-readable non-transitory storage medium that stores the control program, and a system equipped with the vehicle control device and a vehicle.

The present disclosure is useful when reduction of the effects of communication delay that occurs between a vehicle and the cloud when the vehicle is controlled using a vehicle control device provided on the cloud, and so forth, is desirable.

What is claimed is:

1. A vehicle control device comprising:
communication equipment configured to transmit a plurality of signals to a vehicle using a plurality of communication paths; and
a processor configured to
set a priority level regarding communication for each of the plurality of signals,
acquire an individual communication latency for each of the plurality of communication paths and a total communication latency for the plurality of communication paths combined, and
determine a communication path to allocate to each of the plurality of signals based on the individual communication latency, the total communication latency, and the priority level, wherein the processor
determines whether the total communication latency is less than a first threshold value, equal to or greater than the first threshold value and less than a second threshold value, or equal to or greater than the second threshold value,
allocates the plurality of signals to the plurality of communication paths regardless of the priority level in a case where the total communication latency is less than the first threshold value,
allocates the plurality of signals to the plurality of communication paths with priority given to a signal having the priority level higher than a first predetermined priority level among the plurality of signals without executing a reduction process in a case where the total communication latency is equal to or greater than the first threshold value and less than the second threshold value, the reduction process including reducing communication data amount or a communication rate of a signal having the priority level lower than a second predetermined priority level among the plurality of signals, and
allocates the plurality of signals to the plurality of communication paths with priority given to a signal having the priority level higher than the first predetermined priority level among the plurality of signals after executing the reduction process in a case where the total communication latency is equal to or greater than the second threshold value, wherein
the communication equipment is configured to transmit each of the plurality of signals to the vehicle using the allocated communication path.

2. The vehicle control device according to claim 1, wherein the plurality of signals includes a signal of which the priority level cannot be changed by a user of the vehicle, and a signal of which the priority level can be changed.

3. The vehicle control device according to claim 2, wherein the signal of which the priority level cannot be changed by the user of the vehicle is a signal having a high priority level that is related to safety with regard to the vehicle.

4. The vehicle control device according to claim 1, wherein:
the processor is further configured to execute a plurality of applications included in the vehicle control device; and
the plurality of signals are signals that are requested from the plurality of applications.

5. The vehicle control device according to claim 4, wherein the processor is further configured to
set the priority level regarding communication as tag information for the plurality of applications, and
set the priority level of the plurality of signals by embedding the tag information set for the plurality of applications in the plurality of signals.

6. The vehicle control device according to claim 1, wherein the processor is further configured to generate a digital twin in virtual space that is time-synchronized with real space using a communication delay time between the vehicle and the vehicle control device based on the individual communication latency.

7. The vehicle control device according to claim 1, wherein the processor is further configured to acquire the individual communication latency and the total communication latency based on results obtained from transmitting and receiving predetermined test signals to and from the vehicle at a predetermined cycle using the plurality of communication paths.

8. A system comprising:
a plurality of vehicles; and
a vehicle control device including communication equipment configured to transmit a plurality of signals to an object vehicle using a plurality of communication paths, and a processor, wherein:

the processor is configured to set a priority level regarding communication for each of the plurality of signals, acquire an individual communication latency for each of the plurality of communication paths and a total communication latency for the plurality of communication paths combined, and determine a communication path to allocate to each of the plurality of signals based on the individual communication latency, the total communication latency, and the priority level, wherein the processor determines whether the total communication latency is less than a first threshold value, equal to or greater than the first threshold value and less than a second threshold value, or equal to or greater than the second threshold value, allocates the plurality of signals to the plurality of communication paths regardless of the priority level in a case where the total communication latency is less than the first threshold value, allocates the plurality of signals to the plurality of communication paths with priority given to a signal having the priority level higher than a first predetermined priority level among the plurality of signals without executing a reduction process in a case where the total communication latency is equal to or greater than the first threshold value and less than the second threshold value, the reduction process including reducing communication data amount or a communication rate of a signal having the priority level lower than a second predetermined priority level among the plurality of signals, and allocates the plurality of signals to the plurality of communication paths with priority given to a signal having the priority level higher than the first predetermined priority level among the plurality of signals after executing the reduction process in a case where the total communication latency is equal to or greater than the second threshold value; and the communication equipment is configured to transmit each of the plurality of signals to the object vehicle using the allocated communication path.

9. The vehicle control device according to claim 4, wherein the plurality of applications is configured to execute functions related to safe driving of the vehicle, functions related to fuel or electricity consumption of the vehicle, and functions related to air conditioning in a vehicle cabin of the vehicle.

10. The vehicle control device according to claim 4, wherein the processor is further configured to equally allocate the plurality of signals requested from the plurality of applications to the plurality of communication paths regardless of the priority level in the case where the total communication latency is less than the first threshold value.

* * * * *